US012592465B2

(12) United States Patent
Hjortshøj et al.

(10) Patent No.: US 12,592,465 B2
(45) Date of Patent: Mar. 31, 2026

(54) BROADBAND MICROWAVE WINDOW ASSEMBLY

(71) Applicant: Organic Fuel Technology A/S, Aarhus (DK)

(72) Inventors: Anders Hjortshøj, Risskov (DK); Jens Christian Pedersen, Risskov (DK); Poul Leth-Espensen, Skanderborg (DK)

(73) Assignee: Organic Fuel Technology A/S, Aarhus C (DK)

( * ) Notice: Subject to any disclaimer, the term of this patent is extended or adjusted under 35 U.S.C. 154(b) by 396 days.

(21) Appl. No.: 18/557,170

(22) PCT Filed: May 4, 2022

(86) PCT No.: PCT/EP2022/061988
§ 371 (c)(1),
(2) Date: Oct. 25, 2023

(87) PCT Pub. No.: WO2022/233940
PCT Pub. Date: Nov. 10, 2022

(65) Prior Publication Data

US 2024/0222828 A1 Jul. 4, 2024

(30) Foreign Application Priority Data

May 5, 2021 (DK) ........................... PA 2021 70211

(51) Int. Cl.
*H01P 1/08* (2006.01)
*H05B 6/70* (2006.01)

(52) U.S. Cl.
CPC ............... *H01P 1/08* (2013.01); *H05B 6/707* (2013.01)

(58) Field of Classification Search
CPC .... H01P 1/08; H01P 1/16; H01P 1/162; H01P 1/165; H01P 1/172; H01P 1/212; H01P 1/213; H01P 1/215; H01P 1/219
See application file for complete search history.

(56) References Cited

U.S. PATENT DOCUMENTS

| | | | | | |
|---|---|---|---|---|---|
| 2,412,446 | A * | 12/1946 | De Walt | H01P 1/08 | 333/13 |
| 2,847,647 | A * | 8/1958 | Zaleski | H01P 1/19 | 333/113 |
| 2,894,228 | A * | 7/1959 | Geisler, Jr. | H01P 1/08 | 333/252 |
| 3,039,068 | A * | 6/1962 | Greco | H01P 1/08 | 333/252 |

(Continued)

FOREIGN PATENT DOCUMENTS

| | | | | |
|---|---|---|---|---|
| EP | 0465845 A2 | 1/1992 | | |
| WO | WO-2022233940 A1 * | 11/2022 | | H05B 6/707 |

OTHER PUBLICATIONS

International Search Report for PCT/EP2022/061988 dated Sep. 7, 2022.

*Primary Examiner* — David A Vanore
(74) *Attorney, Agent, or Firm* — Knobbe, Martens, Olson & Bear LLP

(57) ABSTRACT

The present invention relates to a broadband microwave window assembly comprising a Brewster waveguide window, a single mode microwave reactor system comprising a waveguide with a Brewster waveguide window and a method to produce a waveguide with a Brewster waveguide window.

13 Claims, 8 Drawing Sheets

(56) References Cited

U.S. PATENT DOCUMENTS

| | | | | | |
|---|---|---|---|---|---|
| 3,857,112 | A | * | 12/1974 | Epis | H01P 1/172 333/252 |
| 4,352,077 | A | | 9/1982 | Gerlack | |
| 4,358,744 | A | | 11/1982 | Tikes | |
| 4,684,908 | A | * | 8/1987 | Kuntzmann | H01P 1/08 333/252 |
| 6,076,484 | A | * | 6/2000 | Matsumoto | H01J 37/32192 118/723 MR |
| 2001/0054605 | A1 | * | 12/2001 | Suzuki | H01Q 21/005 219/121.41 |
| 2002/0050486 | A1 | * | 5/2002 | Ishii | H01J 37/32229 219/121.52 |
| 2007/0176709 | A1 | * | 8/2007 | Oksuz | H01J 37/32192 333/109 |
| 2009/0278054 | A1 | * | 11/2009 | Kamarehi | H01J 37/32211 250/424 |
| 2015/0022287 | A1 | * | 1/2015 | Jannotta | H01P 5/082 333/21 R |
| 2020/0287258 | A1 | * | 9/2020 | Stowell | H01P 3/12 |
| 2024/0222828 | A1 | * | 7/2024 | Hjortshøj | H01P 1/08 |

* cited by examiner

| | | | |
|---|---|---|---|
| $P1(X,Y,Z)$ | 16 | 28.771752 | -62.500000 |
| $P2(X,Y,Z)$ | -0.020000 | -45.148318 | -62.500000 |
| $P2-P1$ | -16.02000 | -73.920070 | 0 |
| $\|P2-P1\|$ | 75.636083 | | |

| | | | |
|---|---|---|---|
| $P1(X,Y,Z)$ | 16 | 28.771752 | -62.500000 |
| $P2(X,Y,Z)$ | -0.020000 | -45.148318 | -62.500000 |
| $P2-P1$ | -16.02000 | -73.920070 | 0 |
| $\|P2-P1\|$ | 75.636083 | | |

| e-field (f=2.45;x=0)_1 (peak) | |
|---|---|
| Cutplane normal: | 1, 0, 0 |
| Cutplane position: | -1.845e-13 |
| Component: | Abs |
| 2D Maximum: | 1013 |
| Frequency: | 2.45 |
| Phase: | 224 |

| e-field (f=2.45;x=0)_1 (peak) | |
|---|---|
| Cutplane normal: | 0.02584, -0.3087, 0.9508 |
| Cutplane position: | 2.08e-23 |
| Component: | Abs |
| 2D Maximum: | 377.4 |
| Frequency: | 2.45 |
| Phase: | 104 |

BROADBAND MICROWAVE WINDOW ASSEMBLY

CROSS REFERENCE TO RELATED APPLICATIONS

This application is a U.S. National Phase Application of PCT International Application Number PCT/EP2022/061988, filed on May 4, 2022, designating the United States of America and published in the English language, which is an International Application of and claims the benefit of priority to Danish Patent Application No. PA 2021 70211, filed on May 5, 2021. The disclosures of the above-referenced applications are hereby expressly incorporated by reference in their entireties.

FIELD OF THE INVENTION

The present invention relates to a broadband microwave window assembly comprising a Brewster waveguide window, a single mode microwave reactor system comprising a waveguide with a Brewster waveguide window and a method to produce a waveguide with a Brewster waveguide window.

BACKGROUND OF THE INVENTION

Microwaves are widely used in modern technology.

For several applications, such as in industrial pyrolysis, or in medical and high power physics, radar and telecom applications, it is desirable to achieve transmission of high power without significant losses.

High power microwave propagation through waveguides often requires the presence of microwave windows that are able to select between desired frequency to be transmitted and undesired frequency to be reflected and to isolate between gasses or air pressure without significant losses.

For these applications, microwave windows may be arranged so as to follow the Brewster principle.

However, solutions employing Brewster angle in general require a plane wave or a quasi-plane wave, the circular TE01 mode or the Gaussian LP01 or HE11 mode.

In that, when fundamental mode propagation is desired, these solutions requires transformation of the fundamental mode into the above mentioned modes in order to allow for transmittal within the window. This generally results in substantial power reduction and requires expensive and complex mode converters.

Hence, there is the need for waveguide solutions allowing for single fundamental mode high power microwave transmission within a waveguide without significant build-up of trapped modes, i.e. ghost modes, or reflection of incident power.

Overheating is also a general problem of microwave windows.

In that, a broadband microwave window assembly able to couple high frequency, high power microwave radiation within a waveguide without overheating, significant build-up of trapped modes, or reflection of incident power, would be advantageous.

OBJECT OF THE INVENTION

An object of the present invention is to provide a broadband microwave window assembly able to couple high frequency, high power microwave radiation within the waveguide without overheating, significant build-up of trapped modes, or reflection of incident power.

An object of the present invention may also be seen as to provide an alternative to the prior art.

In particular, it may be seen as an object of the present invention to provide a broadband microwave window assembly able to couple high frequency, high power microwave radiation within the waveguide without overheating, significant build-up of trapped modes, or reflection of incident power though the use of inductive irises and a microwave window pane comprising low dielectric loss ceramic materials.

SUMMARY OF THE INVENTION

Thus, the above-described object and several other objects are intended to be obtained in a first aspect of the invention by a broadband microwave window assembly comprising: a rectangular waveguide; a microwave window pane inclined with respect to the propagation direction of microwaves in accordance with the Brewster angle, the microwave window pane located within the rectangular waveguide; inductive irises located around the microwave window pane.

The invention relates to a distributed waveguide window in fundamental mode rectangular waveguides. The window broadband microwave window assembly may thus be seen as a single mode broadband microwave window assembly, as only the fundamental mode is present and propagates in the rectangular waveguide.

The waveguide window pane is positioned at the Brewster angle inside the rectangular waveguide.

The Brewster angle is an angle of incidence at which the microwaves travelling along waveguides having a particular mode are perfectly transmitted through a dielectric surface, with no reflection.

Solutions employing Brewster angle in general require a plane wave or a quasi-plane wave, the circular TE01 mode or the Gaussian LP01 or HE11 mode. Such solutions require transformation of the fundamental mode into the mentioned modes in order for them to function.

In the broadband microwave window assembly of the invention, the microwave window pane width has been adjusted by employing inductive irises to overcome the non-plane wave condition within the rectangular waveguide and to match out the capacitive loading of the waveguide.

The microwave window pane inclined with respect to the propagation direction of microwaves in accordance with the Brewster angle may be also referred to as a Brewster window that is a transparent plate oriented at Brewster's angle such that parasitic reflection losses are minimized.

The pane, which is transparent to microwaves, has plane-parallel, flat main surfaces. The plane, formed by the propagation direction and the normal to the pane, is in the same plane as the polarisation direction of the microwaves.

The inductive irises are symmetrical irises located around, such as surrounding the microwave window pane or at least at the edges, such as at least at two edges of the microwave window pane.

Although being positioned at the Brewster angle in the rectangular waveguide, the microwave window pane may be viewed as a distributed microwave window assembly. At each point in the microwave window assembly along the axis of wave propagation, the presence of inductive irises allows for cancellation of the capacitive loading of the rectangular waveguide due to the microwave window pane. In this way the microwave window assembly may be considered as broadband.

In some embodiments, the broadband microwave window assembly according to first aspect is configured to operate in the fundamental TE10 waveguide mode.

Electromagnetic waves can travel along waveguides using a number of different modes.

As to rectangular waveguides or hollow rectangular waveguides, i.e. a waveguide having a rectangular cross section, there two types of waves in a hollow waveguide with only one conductor: transverse electric (TE) and transverse magnetic (TM) waves.

Transverse electric (TE) modes are characterized by having only a magnetic field along the direction of propagation no electric field in the direction of propagation. TE modes have the electric vector (E) being always perpendicular to the direction of propagation.

The fundamental mode of a waveguide is the mode that has the lowest cutoff frequency. For a rectangular waveguide, the TE10 mode is the fundamental mode.

The rectangular waveguide may be a standard 3.4 inches waveguide such as a WR-340 waveguide. However, rectangular waveguide having different dimensions may be used by applying opportune adjustments.

The rectangular waveguide may thus operate in its fundamental TE10 mode at a frequency of 2.45 GHz. However, operation in other modes or at different frequency may be used by applying opportune adjustments.

In some other embodiments, the microwave window pane comprises ceramic materials, such as alumina ceramic materials.

The microwave window pane may be constructed of a special low loss Alumina ceramic material. The material, however, can be of different types with other dielectric properties which, in turn, would result in adjustments of the Brewster angle and of the irises size.

In some embodiments, the low loss Alumina ceramic material may comprise $Al_2O_3$ in a percentage between 92% and 99.9%, such as 99.8% of $Al_2O_3$. The low loss Alumina ceramic material may also comprise other elements in traces, such as Si in a concentration between 10 and 1000 ppm, such as 60 ppm, Na in a concentration between 1 and 250 ppm, such as 10 ppm, FE in a concentration between 1 and 100 ppm, such as 60 ppm, Mg in a concentration between 1 and 1000 ppm, such as 250 ppm.

The low loss Alumina ceramic material may have a grain size between 0.5 and 35 μm and average grain size of 6 μm.

In some further embodiments, the ceramic materials are low dielectric loss ceramic materials.

Low dielectric loss is referred to as lower then 10-3, such as lower than 10-4 as measured according to ASTM-D150.

Low-loss dielectric materials may be used to produce the microwave window pane according to the invention.

These may also be referred to as oxide ceramics or microwave ceramics.

Properties of microwave ceramics depend on several parameters including their composition, the purity of starting materials, processing conditions and their ultimate densification/porosity.

Optimal low-loss dielectric material for microwave ceramics may have optimised value of relative permittivity or dielectric constant (εr), low dielectric loss (loss tangent, tan δ), low temperature coefficient of resonant frequency (τf) and high shear/tensile strength and appropriate Young's Modulus.

Tantalates, niobates, titanates, silicates, tungstates, molybdanates, vanadates or tellurates based on alkali earth metal and rare earths may also be used as low dielectric loss ceramic materials.

Other low dielectric loss material may be used. For example high temperature glass ceramic, such as Macor®, aluminium oxynitride, such as ALON®, boron nitride, quartz, fused silica, diamond, sapphire and beryllium oxide may be used as low dielectric loss ceramic materials according to the invention.

In some embodiments, the ceramic materials have a dielectric constant between 3 and 12, such as between 9 and 10.

This has the advantage of reducing the likelihood of overmodes/ghost modes which generally exist in the window having materials with high dielectric constant.

For example the ceramic materials of the microwave window pane may have a dielectric constant between 9.7 and 9.9, such as 9.8.

According to the invention, the angle of the window pane relative to the plane of the waveguide broad wall should decrease when the dielectric constant increases. In that, slightly higher value of dielectric constant, such as between 9.7 and 9.9 requires a smaller angle, i.e. a longer window pane, which in turn allows for a better distribution of the power hitting the window pane surface.

In some further embodiments, the microwave window pane has a thickness lower than 10% of the microwave wavelength propagating within the rectangular waveguide when in operation.

A microwave window pane with a thickness lower than 10% of the microwave wavelength propagating within the rectangular waveguide when in operation has the advantage of preventing ghost-modes and wave propagation through the microwave window pane.

A microwave window pane with a thickness lower than 10% of the microwave wavelength propagating within the rectangular waveguide has shown to be the maximum acceptable thickness to prevent ghost-modes, and wave propagation through the microwave window pane.

For example, a microwave window pane having a thickness lower than or equal to 3 mm, has shown to prevent ghost-modes and wave propagation through the microwave window pane.

The broadband microwave window assembly of the invention has the advantage of being able to be used with rectangular waveguides to couple high frequency, high power microwave radiation within the waveguide without overheating, significant build-up of trapped modes, or reflection of incident power.

However, in some embodiments, the presence of cooling means may be advantageous.

In some embodiments, the broadband microwave window assembly further comprises means for cooling said microwave window pane.

The advantage of using means for cooling is that these lower the stress on the window pane and reduce possible variations of the properties of the window pane induced by temperature variations.

Means of cooling allows for temperature reduction within the broadband microwave window assembly.

Means for cooling may be channels having at least part of their external surfaces in contact with the heat transferring surfaces of surrounding the microwave window pane.

In some embodiments, the means for cooling are or comprise fluid heat exchangers.

The cooling fluid may be a liquid or a gas.

For example, a counter current heat exchanger between two liquids may be used so provide cooling to the microwave window pane.

In some further embodiments, the fluid heat exchangers are or comprise water cooling channels.

The fluids heat exchangers may comprise further means for cooling.

For example, the fluid heat exchangers may be or comprise air cooling fins.

This use of means for cooling produced a broadband microwave window assembly able to handle 10 KW CW power without significant temperature rise of the microwave window pane.

Other features may be present improving the easy use of the broadband microwave window assembly according to one aspect of the invention.

In some embodiments, the broadband microwave window assembly further comprises means for inspecting the temperature of the microwave window pane.

The means for inspecting the temperature of the microwave window pane may be a means for inspecting the temperature of or at the microwave window pane.

In some further embodiments, the means for inspecting the temperature of the microwave window pane are or comprise an Infra-Red (IR) sensor within a thermal camera inspection tube monitoring the temperature of the microwave window pane.

The presence of an IR sensor within a thermal camera allows for an optimal temperature evaluation of the temperature of the microwave window pane.

In order to monitor the temperature of the microwave window pane, a circular tube may be inserted into the broadband microwave window assembly.

The tube may be designed with a diameter small enough to be at cutoff at 2.45 GHz. This makes it possible to insert an IR sensor into the tube to monitor the microwave window pane temperature.

In some embodiments, the inductive irises are matched to the frequency and the characteristics of the ceramic materials, so that the capacitive impedance of the window pane and the inductive impedance of the irises cancel out.

The inductive irises are placed within the magnetic field and are effectively obstructions within the window pane that provide inductive elements.

The irises place a shunt inductance across the window pane that is proportional to the size of irises.

The inductive irises of the invention are matched to the frequency of the ceramic material of the window pane so that the inductive impedance of the irises cancel out the capacitance impedance of the window pane.

In general the dimension of the irises may depend on the frequency on the material used and on other parameters. For example, the cross section of the irises may be 10 mm×4.35 mm.

In a second aspect the invention relates to a single mode microwave reactor system comprising: a single mode microwave reactor comprising a reactor chamber and means for transmitting single mode microwaves into a reactor chamber connected to the reactor chamber; a microwave generator; a broadband microwave window assembly according to the first aspect of the invention connecting the microwave generator to the single mode microwave reactor.

The single mode microwave reactor system may be also referred to as single dominating mode microwave reactor system.

Single mode or single dominating mode microwave reactors is herein defined as a reactor in which microwaves propagates substantially in a single mode.

The single mode or single dominating mode of propagation maybe a transverse electric (TE) mode.

The broadband microwave window assembly of the invention may be used in combination with a single mode or single dominating mode microwave flow reactor supressing the propagation of over-modes, so that the material to be processed receive a more even distribution of Electric field.

The broadband microwave window assembly of the invention in combination with a single mode or single dominating mode microwave flow reactor provides a single mode microwave reactor system able to produce a homogenous electromagnetic field distribution within the reactor.

Accordingly one application of the broadband microwave window assembly may be within microwave-heating applications for environmental and medical uses, microwave drying processing, food processing, ink and paint as well as in wood treatments and agricultural uses.

A further application of the broadband microwave window assembly may also be within radar and telecom applications, microwave chemistry and material processing related to inorganic or organic synthesis, for biochemistry reaction, polymer related processes as well for catalytic chemistry processing.

The broadband microwave window assembly eliminates high voltage buildup in the vicinity of the microwave window pane, thereby not accelerating charged dust particles onto the microwave window pane and also not accreting particles which in turn could lead to an electrical breakdown of the microwave window pane and/or of the broadband microwave window assembly.

In that, the broadband microwave window assembly may be used for several applications which require high power transmission, e.g. medical or other high power physics applications.

In a third aspect, the invention relates to a method of producing a broadband microwave window assembly according to the first aspect of the invention, the method comprising: assembling identical half housing of the broadband microwave window assembly; fastening the housing.

Fastening may be accomplished by welding, screwing or other fastening technique.

The broadband microwave window assembly may be made out of four aluminium parts assembled in the middle of the rectangular waveguide broad wall, and at the microwave window pane position, along the microwave window pane, respectively.

The broadband microwave window assembly may be made out of titanium and may be produced through additive manufacturing or 3D printing processes.

This assembling is determined by the fact that the surface currents in the fundamental mode originate from the middle of the waveguide broad wall. Therefore there is no current flow at this assembly position, making a mechanical split of the structure possible.

The first and other aspects and embodiments of the present invention may each be combined with any of the other aspects and embodiments. These and other aspects of the invention will be apparent from and elucidated with reference to the embodiments described hereinafter.

BRIEF DESCRIPTION OF THE FIGURES

The broadband microwave window assembly comprising a Brewster waveguide window, a single mode microwave reactor system comprising a waveguide with a Brewster waveguide window and a method to produce a waveguide with a Brewster waveguide window will now be described in more details with regard to the accompanying figures. The figures show one way of implementing the present invention and are not to be construed as being limiting to other possible embodiments falling within the scope of the attached claim set.

DETAILED DESCRIPTION OF AN EMBODIMENT

Figure 1:
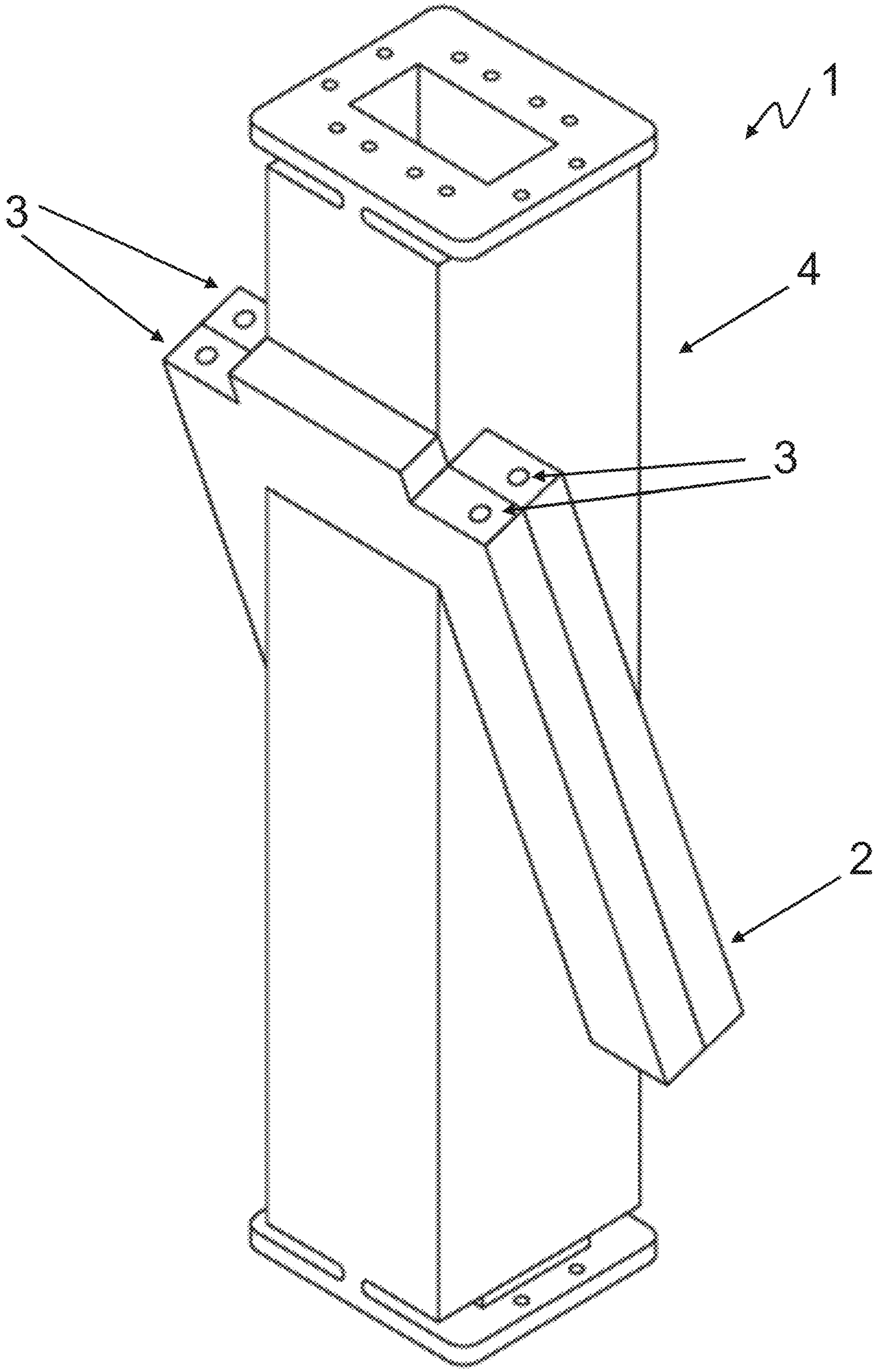
FIG. 1 is a schematic illustration of a broadband microwave window assembly according to some embodiments of the invention.

FIG. 1 is a schematic illustration of a broadband microwave window assembly 1 showing some of the relevant features of the assembly.

FIG. 1 shows the rectangular waveguide 4 and the location 2 of the microwave window pane (not shown).

FIG. 1 further shows the presence of means for cooling, i.e. cooling channels 3.

Figure 2:
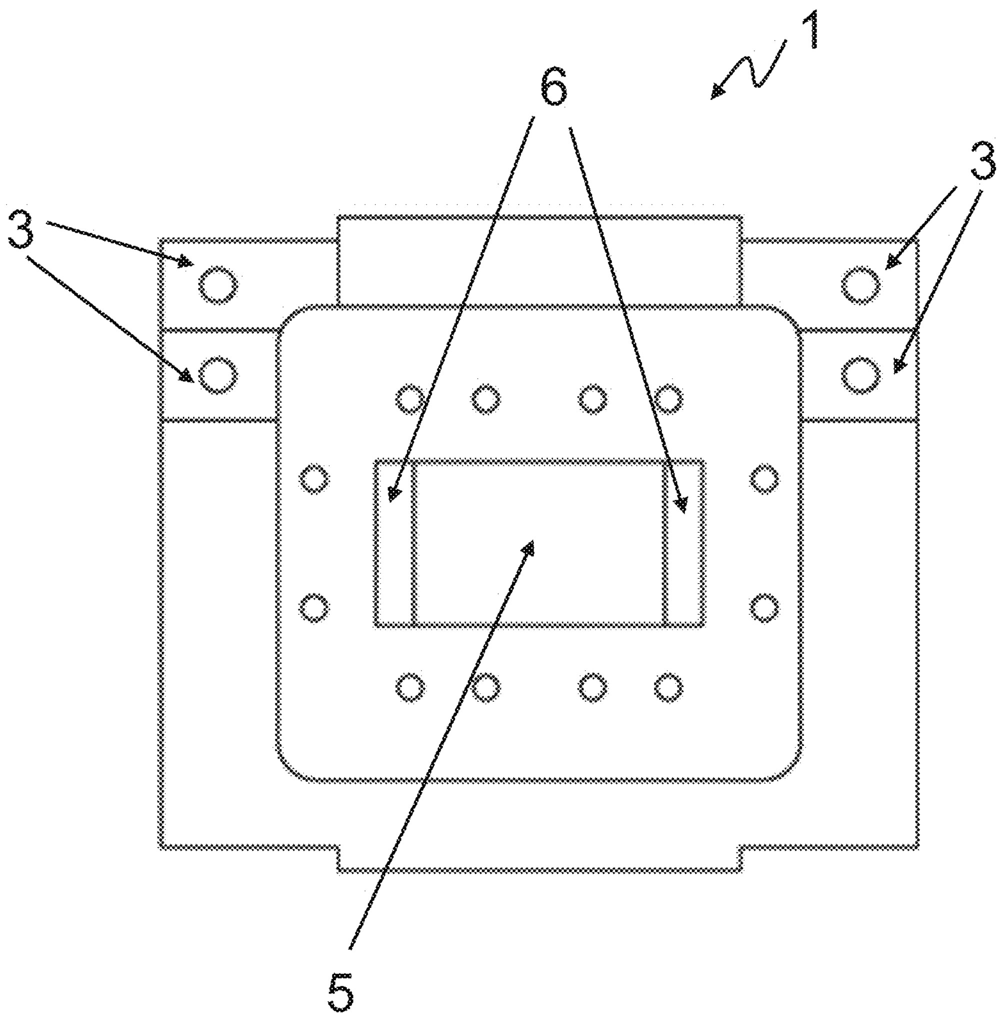
FIG. 2 is a top view of a broadband microwave window assembly according to some embodiments of the invention.

FIG. 2 is a top view of a broadband microwave window assembly 1.

In FIG. 2 the microwave window pane 5 is shown although it cannot be appreciated the inclination with respect to the propagation direction of microwaves in accordance with the Brewster angle.

The presence of inductive irises 6 is shown located on the sides of the around the microwave window pane 5.

FIG. 2 further shows the presence of the cooling channels 3.

Figure 3A:
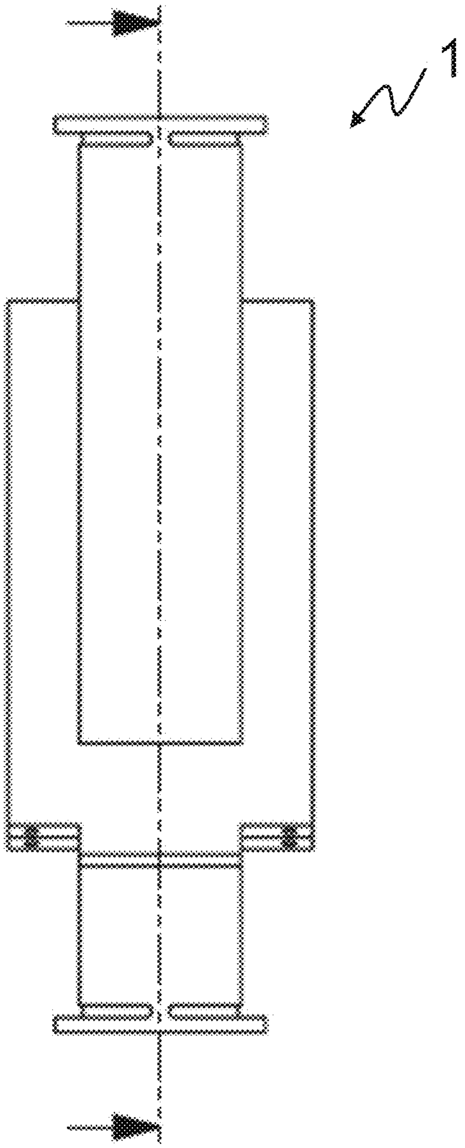
FIG. 3A is a side view indicating the positioning of the cross section of FIG. 3B of a broadband microwave window assembly according to some embodiments of the invention.
Figure 3B:
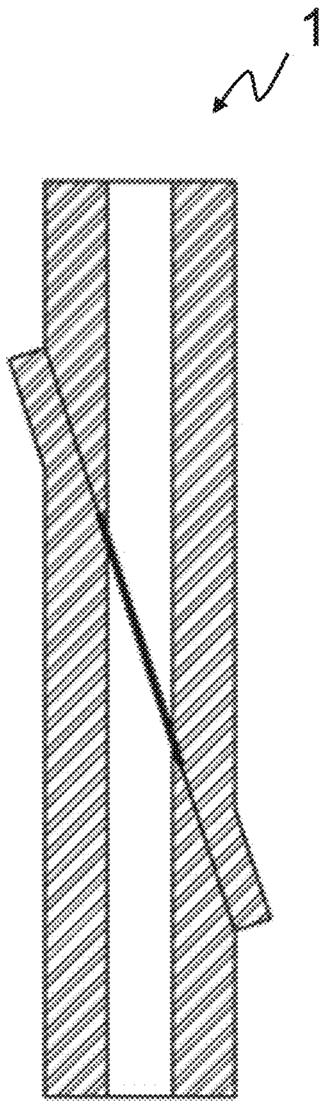
FIG. 3B is a cross section of a broadband microwave window assembly according to some embodiments of the invention.

FIG. 3B is a further illustration of a cross section of a broadband microwave window assembly 1.

FIG. 3A is a side view indicating the position of the cross section of FIG. 3B of a broadband microwave window assembly 1.

Figure 4A:
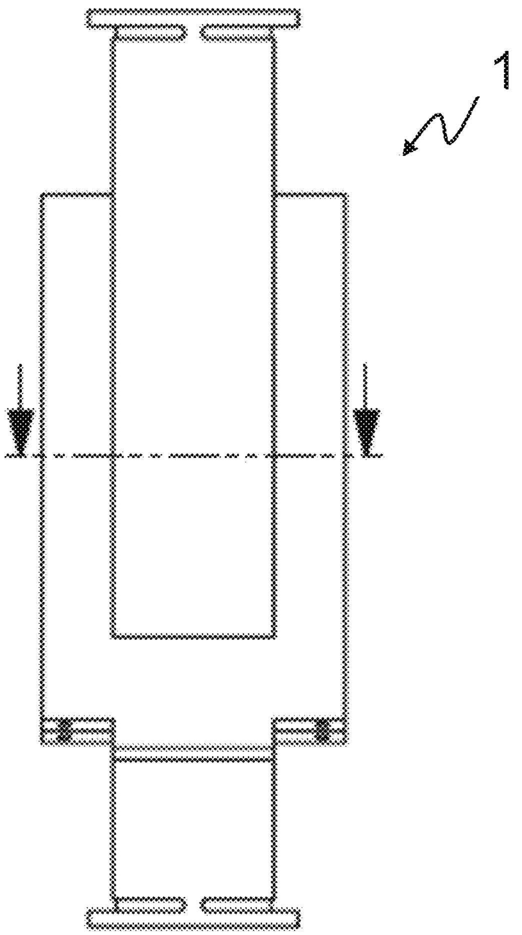
FIG. 4A is a side view indicating the positioning of the cross section of FIG. 4B
Figure 4B:
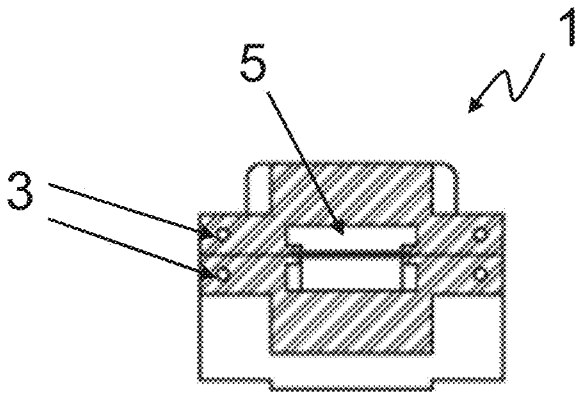
FIG. 4B is a cross section of a broadband microwave window assembly according to some embodiments of the invention.

FIG. 4B is a further illustration of a cross section of a broadband microwave window assembly 1.

FIG. 4A is a side view indicating the position of the cross section of FIG. 4B of a broadband microwave window assembly 1.

In FIG. 4B the microwave window pane 5 and the cooling channels 3 can be noticed.

Figure 5:
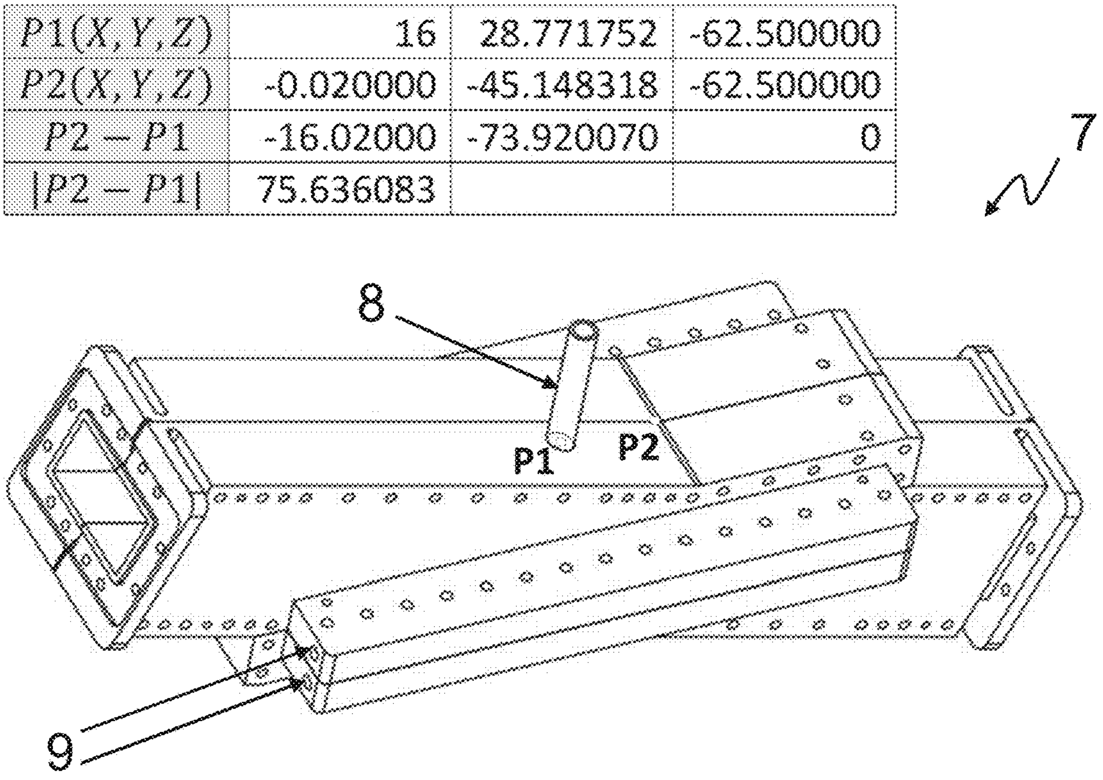
FIG. 5 is a schematic illustration of a broadband microwave window assembly according to some embodiments of the invention showing water cooling channels.

FIG. 5 is a schematic illustration of a broadband microwave window assembly 7 showing the presence of cooling channels 9.

FIG. 5 shows also the location of the inspection tube 8 for inserting an IR sensor within a thermal camera allowing for an optimal temperature evaluation of the temperature of the microwave window pane.

Figure 6:
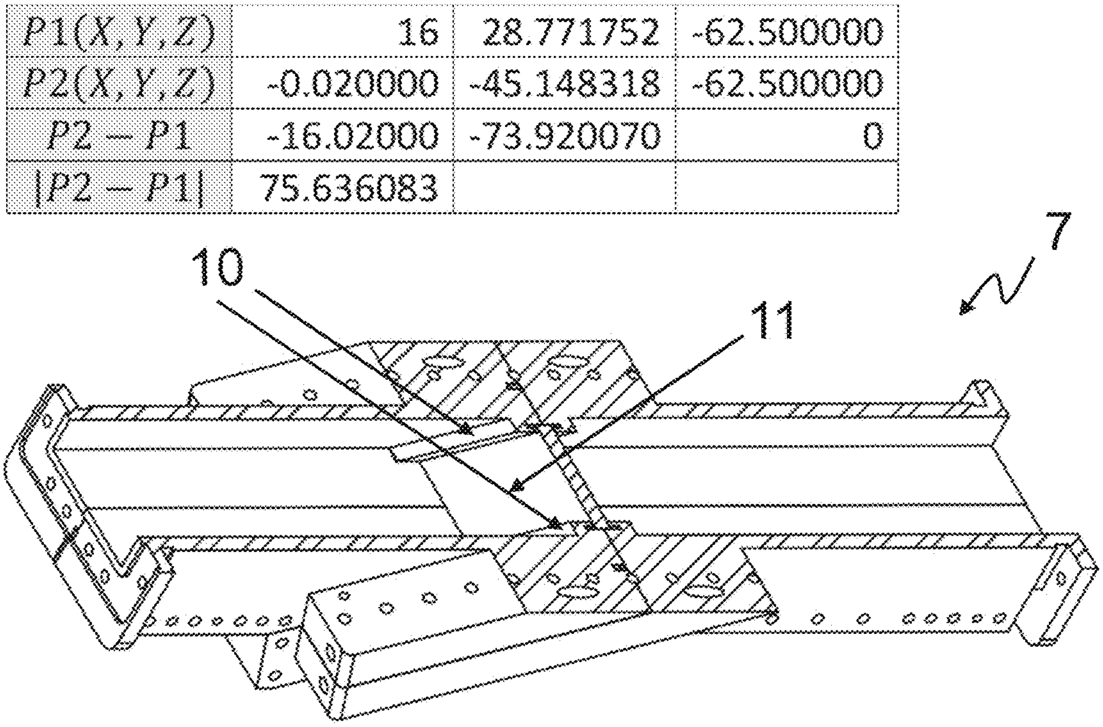
FIG. 6 is a cross section of a broadband microwave window assembly according to some embodiments of the invention showing the inductive irises.

FIG. 6 is a cross section of a broadband microwave window assembly 7 showing inductive irises 10 at the edges of the microwave window pane 11.

Figure 7:
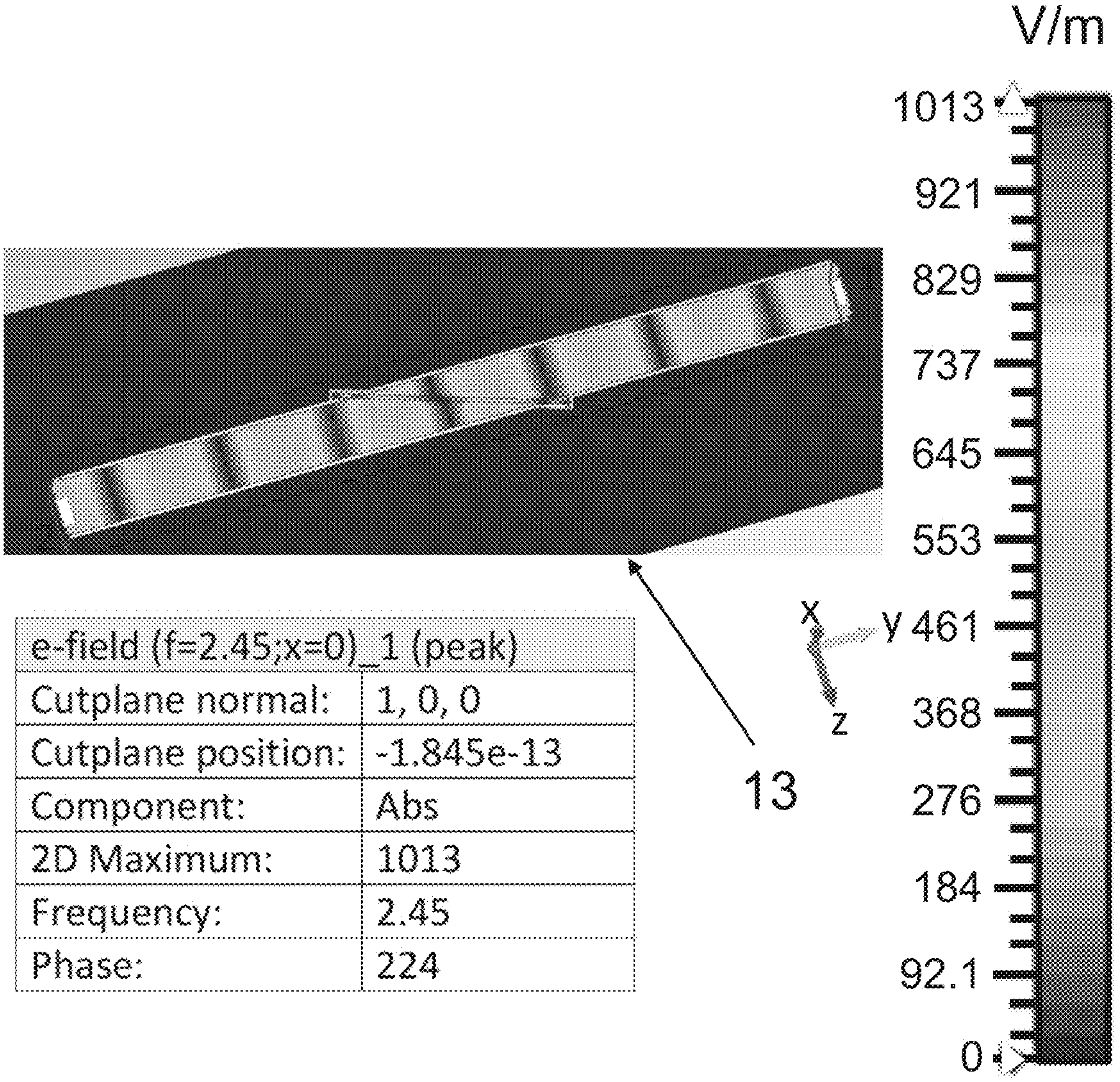
FIG. 7 is a cross sectional view of the E-field in the direction of propagation of the microwaves inside the broadband microwave window assembly according to some embodiments of the invention.

FIG. 7 is a cross sectional view of the E-field 13 in the direction of propagation of the microwaves inside the broadband microwave window assembly.

Figure 8:
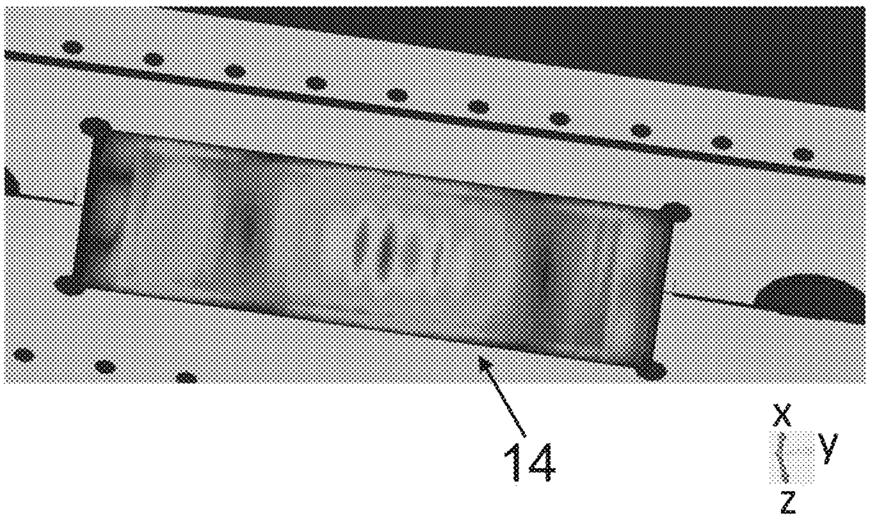
FIG. 8 is a cross sectional view of the E-field orthogonal to the direction of propagation of the microwaves inside the microwave window pane of the broadband microwave window assembly according to some embodiments of the invention.
Figure 8:
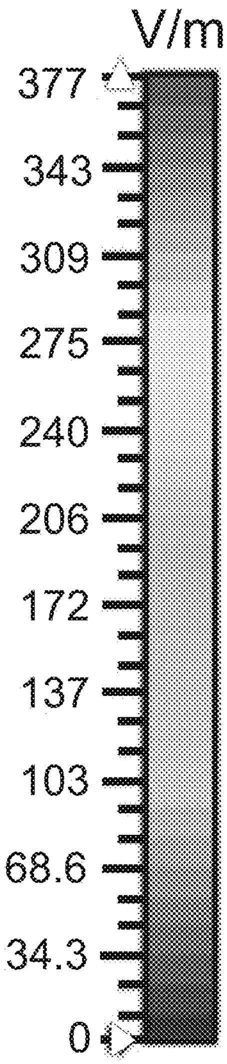

FIG. 8 is a cross sectional view of the E-field 14 orthogonal to the direction of propagation of the microwaves inside the microwave window pane of the broadband microwave window assembly.

Figure 9:
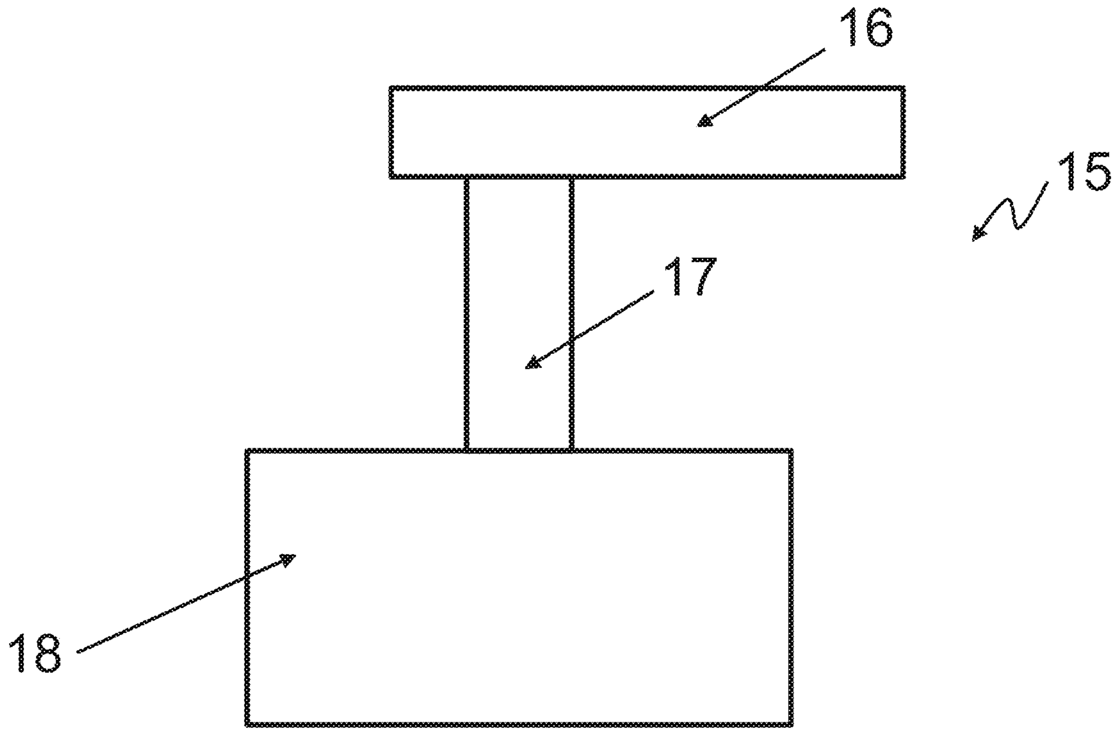
FIG. 9 is a schematic illustration of the single dominating mode microwave reactor system according to some embodiments of the second aspect of the invention.

FIG. 9 is a schematic illustration of the single dominating mode microwave reactor system 15.

The single mode microwave reactor system 15 comprises a single mode microwave reactor 18, a microwave generator 16 and a broadband microwave window assembly 17 connecting the microwave generator 16 to the single mode microwave reactor 18.

Figure 10:
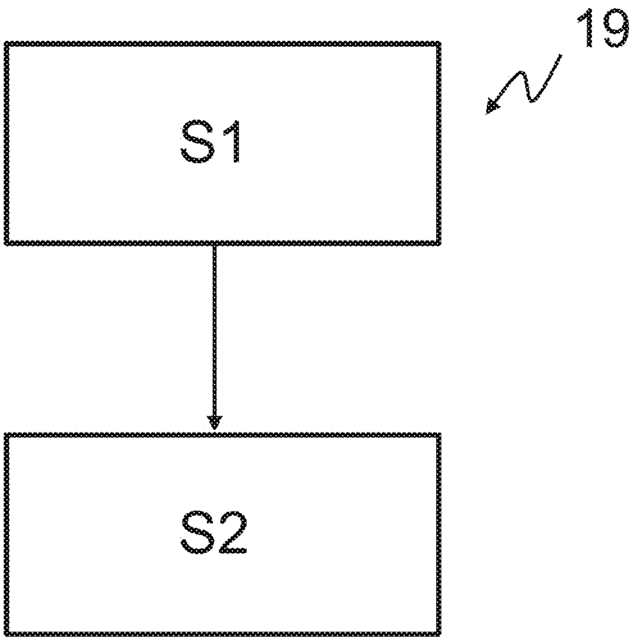
FIG. 10 is a flow chart of the method of producing a broadband microwave window assembly according to some embodiments of the third aspect of the invention.

FIG. 10 shows a flow chart 19 of the method of producing a broadband microwave window assembly, the method comprising the steps of

- S1, assembling identical half housing of the broadband microwave window assembly;
- S2, fastening the housing.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A broadband microwave window assembly configured to operate in the fundamental TE10 waveguide mode, said broadband microwave window assembly comprising:

- a rectangular waveguide;
- a rectangular microwave window pane inclined with respect to the propagation direction of microwaves in accordance with the Brewster angle, said rectangular microwave window pane located within said rectangular waveguide, wherein said rectangular microwave window pane has a thickness lower than 10% of the microwave wavelength; and inductive irises located around said rectangular microwave window pane thereby matching out the capacitive loading of the rectangular waveguide.

2. The broadband microwave window assembly according to claim 1, wherein said rectangular microwave window pane comprises a ceramic material.

3. The broadband microwave window assembly according to claim 2, wherein said ceramic material is a low dielectric loss ceramic material.

4. The broadband microwave window assembly according to claim 2, wherein said ceramic material has a dielectric constant between 3 and 12.

5. The broadband microwave window assembly according to claim 1, further comprising a cooling element configured to cool said rectangular microwave window pane.

6. The broadband microwave window assembly according to claim 5, wherein said cooling element comprises a fluid heat exchanger.

7. The broadband microwave window assembly according to claim 6, wherein said fluid heat exchanger comprises a water cooling channel.

8. The broadband microwave window assembly according to claim 7, wherein said fluid heat exchanger comprises air cooling fins.

9. The broadband microwave window assembly according to claim 1, further comprising a temperature sensor configured to detect the temperature of said rectangular microwave window pane.

10. The broadband microwave window assembly according to claim 9, wherein said temperature sensor comprises an Infra Red (IR) sensor within a thermal camera inspection tube monitoring the temperature of said rectangular microwave window pane.

11. The broadband microwave window assembly according to claim 1, wherein said inductive irises are matched to the frequency and the characteristics of said ceramic material, such that the capacitive impedance of the rectangular microwave window pane and the inductive impedance of the inductive irises cancel out.

12. A single mode microwave reactor system comprising:

a single mode microwave reactor comprising a first reactor chamber and a transmitter capable of transmitting single mode microwaves into a second reactor chamber connected to said first reactor chamber;

a microwave generator;

a broadband microwave window assembly according to claim 1 connecting said microwave generator to said single mode microwave reactor.

13. A method of producing a broadband microwave window assembly according to claim 1, said method comprising:

assembling identical half housing of said broadband microwave window assembly; and fastening said housing.

* * * * *